June 18, 1968     A. P. OAKLEY ET AL     3,388,612
HANDLEBARS
Filed March 18, 1966     2 Sheets-Sheet 1
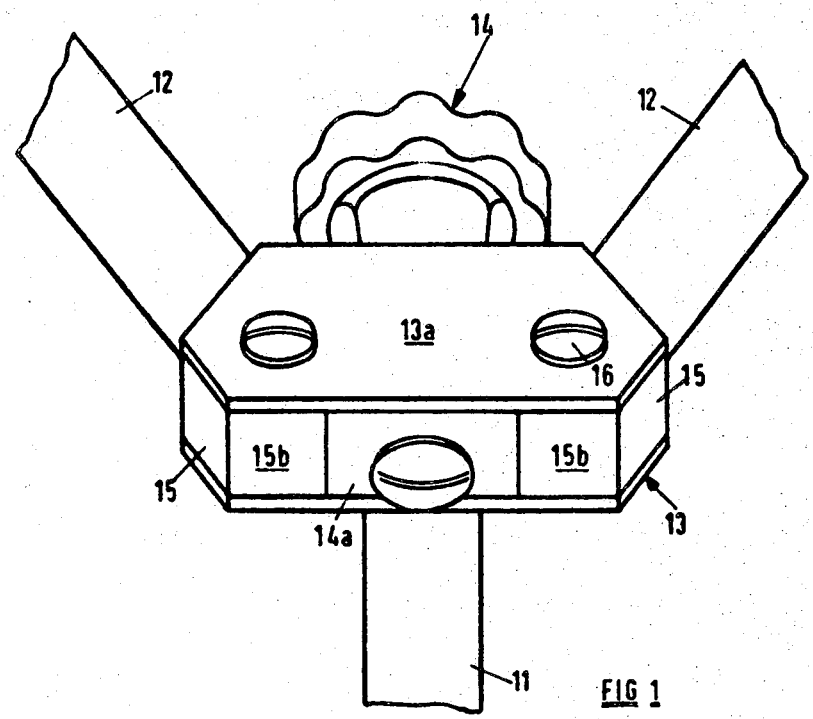
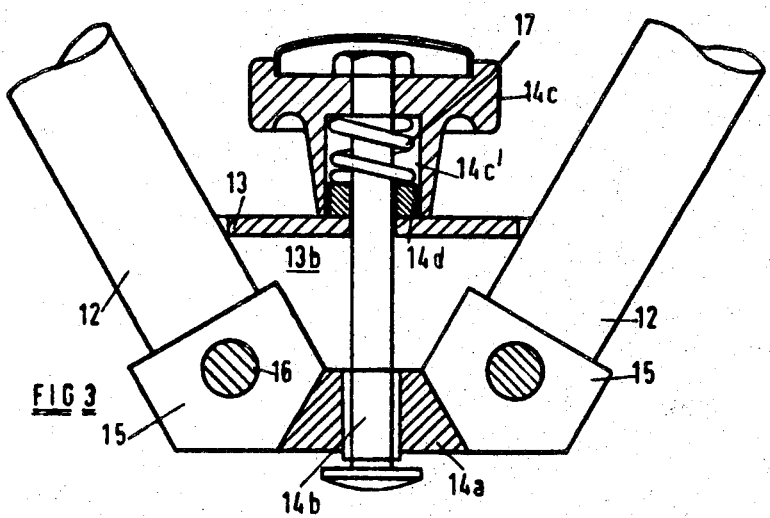
INVENTORS
ALAN P. OAKLEY and
JOHN M. GORDON
BY
Bierman & Bierman United States Patent Office 3,388,612
Patented June 18, 1968

3,388,612
HANDLEBARS
Alan Philip Oakley, Beeston, Nottingham, and John McGregor Gordon, Nuthall, Nottingham, England, assignors to Raleigh Industries Limited, a corporation of the United Kingdom
Filed Mar. 18, 1966, Ser. No. 535,387
Claims priority, application Great Britain, July 17, 1965, 30,473/65
7 Claims. (Cl. 74—551.4)

ABSTRACT OF THE DISCLOSURE

A pair of handlebars are each mounted on a pivotable block having a pair of flat surfaces thereon. A spring biased member having coacting surfaces thereon can be urged against or toward the blocks, whereby the handlebars can be adjusted to and maintained in an operative position.

---

Conventional handlebar structures usually comprise a pillar or stem engageable with the head tube of a bicycle or the like and a shaped handlebar member extending transversely of such pillar and secured thereto a lug being provided on the one part to receive the other and such lug being removably or non-removably secured to the part on which it is provided. Such structures, however, are not of convenient application to collapsible bicycles where the primary consideration is a minimum space requirement for the bicycle in the collapsed state, since the handlebar member retains its full length and, being positioned at an extremity of the frame of the machine will either increase the effective length of such machine if turned to lie in the longitudinal plane thereof or will give a significant measurement in the third dimension if remaining in its normal position relative to the frame.

It is the primary object of the present invention to provide a simple and inexpensive collapsible handlebar structure which can be converted from the erect to the collapsed state and vice versa with the minimum of effort and which will be such as to allow of a maximum reduction in overall dimensions of the bicycle when in the collapsed state.

According to the present invention a collapsible handlebar structure comprises a stem or pillar adapted to be applied to a bicycle or like head tube, two opposed handlebar members movably mounted upon the said pillar or a part secured thereto and having surface abutment portions, and location means co-operably and progressively engageable with the said portions, the said location means and surface abutment portion being so adapted and arranged as upon actuation of such location means positively to locate the handlebar members in a required relative disposition.

In a preferred structure the location means comprises a wedge-shaped member which is progressively drawn between the inclined abutment faces of movably supported mounting blocks so as to move into contact therewith, the saw blocks having the handlebars respectively secured thereto.

The invention will now be described further, by way of example only with reference to the accompanying drawings illustrating two embodiments thereof and in which:

FIG. 1 is a rear elevation of a handlebar structure according to the invention;

FIG. 3 is a view corresponding to FIG. 2 of an alternative construction.

Figure 2:
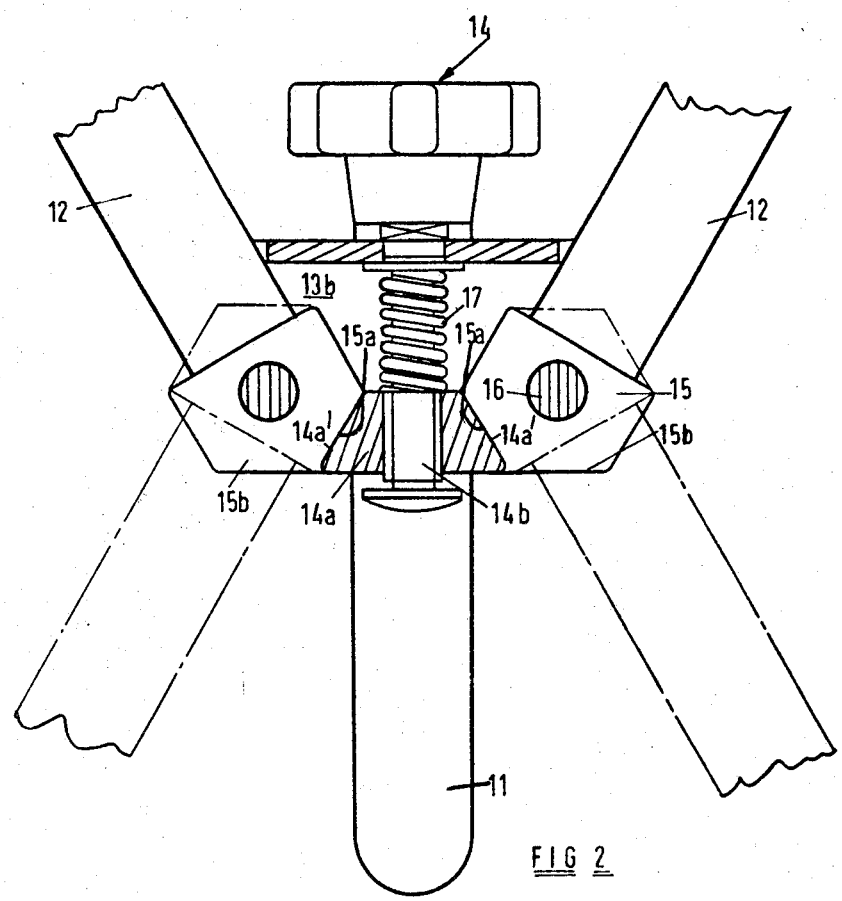
FIG. 2 is a plan view, partly broken away of the arrangement shown in FIG. 1.

Referring now to the drawings, a bicycle handlebar structure comprising a stem or pillar 11 adapted to be engaged with a bicycle head tube (not shown) in conventional manner, two oppositely directed handlebar members 12 pivotally mounted in a U-shaped housing 13 secured to the upper end of such pillar 11, and location means 14 whereby the said members are positioned and held in a requisite relative disposition both as regards each other and the housing.

Each handlebar member 12 has a polygonal mounting block 15 at the supported end thereof, each said block 15 being freely rotatable upon a pivot pin or bolt 16 passing through the housing, the pins for the two handlebar members extending between the opposed limbs 13a, 13b of the U-shaped housing 13 and being symmetrically disposed relative to the pillar 11. Each block 15 is of such thickness as to be a close but free fit within the housing 13 and the end thereof remote from the associated handlebar member presents two mutually inclined surfaces 15a, 15b disposed symmetrically relative to the plane containing the axis of the pivot pin and handlebar member.

The location means 14 comprises a wedge-shaped member 14a disposed between the spaced parallel limbs of the U-shaped member and movable longitudinally of such member by screw means 14b rotatably supported in the housing and in engagement with the wedge-shaped member. A spring 17 is disposed about the screw means. The wedge faces 14a' of the member 14a are so inclined relative to the transverse plane of symmetry of the housing as to cause the handlebar members, when such wedge faces are in contact with inclined surfaces 15a, to lie in a position correspondinging to an assembled condition of the structure whilst when the faces abut surfaces 15b the handlebar members are in the collapsed position. In the arrangement shown in FIG. 3, in which figure like references to those of FIGS. 1 and 2 appear, the screw means 14b is of a different character, the spring 17 being located in a recess 14c' in the rear face of the locking handle 14c and between the inner end face of such recess and a bush or washer 14d bearing against the outside of the housing. Such an arrangement as is shown in FIG. 3 does have the advantage, as compared with that shown in FIGS. 1 and 2 that the wedge member 14a is drawn towards its operative position even when the locking means is not fully screwed up thus to give a fail-safe characteristic to the structure whilst the reverse is the case with the other embodiment.

It is to be appreciated that the handlebar members 12, of both embodiments are maintained in an erected or a collapsed condition by actuating the screw means 14b until the wedge-shaped member 14a is held tightly against the appropriate faces of the respective mounting blocks 15, the release of the handlebar members and their adjustment between the two positions being readily effected by undoing the screw means and moving the members in the appropriate sense.

The invention is not restricted to the exact features of the embodiment hereinbefore described since alternatives will readily present themselves to one skilled in the art. Thus for example, instead of providing a location means of the wedge-shaped member illustrated and effecting the requisite positioning and locking action by progressively moving a single wedge-shaped element into position between mounting blocks by screw means, two such elements may be used.

In a further alternative structure a displaceable spacer having inclined faces corresponding to like faces on the mounting blocks is positionable between such mounting blocks by movement of the spacer in the thickness direction of the blocks and is held in such position by a toggle or other lever structure, the co-operating surfaces of the mounting blocks and the wedge-shaped member being correspondingly bevelled and/or stepped if desired thus to ensure a firm positioning of the handlebar member.

What we claim is:

1. A collapsible handlebar structure comprising a stem or pillar adapted to be applied to a bicycle or like head tube, a housing carried by the said stem or pillar, two mounting blocks supported relative to the said housing and movable about spaced axis relative thereto a handlebar member extendable from each such block and location means movable between the said blocks, the said mounting blocks and location means having co-operating flat surface abutment portions thereon adapted to locate and to retain the said handlebars in a requisite position relative to the stem or pillar, the said location means being movable out of contact with said block sufficiently to permit swinging of said blocks, thereby to allow of the movement of the handlebars between the operative and non-operative positions.

2. A handlebar structure as claimed in claim 1 wherein the location means comprises a wedge member engageable with the abutment portions on the said blocks, a screw means in engagement with the said member and extending outwardly through the housing, a locking handle secured to the said means outwardly of the housing and adapted, upon actuation, to effect rotation of the means of axial displacement thereof, and spring means interposed between the handle and housing arranged to urge the wedge member into engagement with the abutment portions of the blocks.

3. A structure as claimed in claim 2 wherein the locking handle has a recess thereto within which the spring means is located.

4. A collapsible handlebar structure for bicycles and the like comprising a pillar, a housing on said pillar, a pair of spaced pivots in said housing, a wedge block pivotally mounted on each of said pivots, a handlebar secured in each block, each of said blocks having a pair of flat contact surfaces at angles to each other, a location wedge between said blocks and having flat angular faces in contact with said contact surfaces, a screw mounted on said housing in engagement with said location member, a handle on one end of said screw for rotating the same to shift said wedge, and spring means for biasing said wedge.

5. A collapsible handlebar structure as claimed in claim 4, wherein the location wedge is progressively drawn between the inclined faces of movably supported mounting blocks so as to move into contact therewith.

6. A collapsible handlebar structure as claimed in claim 5 wherein the said location wedge is positionally adjustable by said screw.

7. A collapsible handlebar structure as claimed in claim 6 wherein said spring means are provided against the restraint of which the location wedge is drawn between the contact surfaces.

References Cited

FOREIGN PATENTS 383,656 3/1908 France.
508,454 10/1920 France.

MILTON KAUFMAN, *Primary Examiner.*

FRED C. MATTERN, *Examiner.*